(12) United States Patent
Watanabe et al.

(10) Patent No.: US 7,307,743 B2
(45) Date of Patent: Dec. 11, 2007

(54) IMAGE RECORDING DEVICE, SYSTEM, AND METHOD

(75) Inventors: Akira Watanabe, Kanagawa (JP); Takashi Toyofuku, Kanagawa (JP); Daisuke Nakaya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1002 days.

(21) Appl. No.: 10/388,392

(22) Filed: Mar. 17, 2003

(65) Prior Publication Data
US 2003/0184788 A1 Oct. 2, 2003

(30) Foreign Application Priority Data
Mar. 20, 2002 (JP) .............................. 2002-078732

(51) Int. Cl.
*H04N 1/40* (2006.01)
(52) U.S. Cl. ..................................... 358/1.13; 358/468
(58) Field of Classification Search ........ 358/1.16–1.18, 358/1.13, 2.1, 1.2, 468; 399/361–365, 81
See application file for complete search history.

(56) References Cited

U.S. PATENT DOCUMENTS 5,164,842 A * 11/1992 Gauronski et al. .......... 358/401
5,617,518 A * 4/1997 Kuwamoto et al. ........ 358/1.15
6,650,431 B1 * 11/2003 Roberts et al. ............ 358/1.15
6,910,843 B2 * 6/2005 Saw et al. ..................... 412/19

FOREIGN PATENT DOCUMENTS

| JP | A 2001-084245 | 3/2001 |
| JP | A 2001-216064 | 8/2001 |
| WO | WO 200100423 A2 * | 1/2001 |

* cited by examiner

*Primary Examiner*—Thomas D. Lee
*Assistant Examiner*—Stephen Brinich
(74) *Attorney, Agent, or Firm*—Margaret A. Burke; Sheldon J. Moss

(57) ABSTRACT

An output instruction including output conditions that differ by page is instructed by the output instruction unit, the instruction data is analyzed by a data analysis unit, instruction data including instructed output conditions that differ by page is stored, the image data is image-processed by an image processing unit in accordance with the instruction data stored in the data analysis unit, to thereby create an output image, the output conditions of the printing mechanism are switched by an output control unit in accordance with the instruction data, and the output image generated at the image processing unit is printed by a printing mechanism. It is determined whether or not there are contradictions in the instruction data of the image data, resetting is prompted with respect to contradictions, and an appearance when image recording is actually effected in accordance with the instruction data is displayed.

20 Claims, 12 Drawing Sheets

FIG.3

| PRINT |
|---|

PRINTER
NAME [_____]  [PROPERTIES]
☐ BLACK-AND WHITE PRINTING
☑ COLOR PRINTING

PRINTING RANGE
⦿ ALL
○ PAGES [_____]

COPIES
NUMBER OF COPIES [5] ▲▼
☑ COLLATE

PER-PAGE SETTING
⦿ ON    ○ OFF
[PER-PAGE SETTING]

[PRINT PREVIEW]
[OPTIONS]

PAPER
SIZE [A4 ▼]
PAPER TRAY SELECTION [AUTOMATIC ▼]
PAPER TYPE [STANDARD PAPER ▼]

[OK]  [CANCEL]

FIG.4

| PER-PAGE SETTING | | | | | |
|---|---|---|---|---|---|
| | COLOR/ BLACK-AND-WHITE | JAGGY PROCESSING | RESOLUTION | PAPER TYPE | SIZE |
| P1 | COLOR ▼ | OFF ▼ | 600dpi ▼ | COATED PAPER ▼ | A3 ▼ |
| P2 | BLACK-AND-WHITE ▼ | ON ▼ | 400dpi ▼ | COATED PAPER ▼ | A3 ▼ |
| P3 | BLACK-AND-WHITE ▼ | ON ▼ | 400dpi ▼ | BOND PAPER ▼ | A3 ▼ |
| P4 | BLACK-AND-WHITE ▼ | ON ▼ | 400dpi ▼ | BOND PAPER ▼ | A3 ▼ |
| P5 | BLACK-AND-WHITE ▼ | ON ▼ | 400dpi ▼ | BOND PAPER ▼ | A3 ▼ |
| P6 | BLACK-AND-WHITE ▼ | ON ▼ | 400dpi ▼ | BOND PAPER ▼ | A3 ▼ |
| P7 | BLACK-AND-WHITE ▼ | ON ▼ | 400dpi ▼ | COATED PAPER ▼ | A3 ▼ |
| P8 | COLOR ▼ | OFF ▼ | 600dpi ▼ | COATED PAPER ▼ | A3 ▼ |
| ⋮ | | | | | |
| P15 | BLACK-AND-WHITE ▼ | ON ▼ | 400dpi ▼ | COATED PAPER ▼ | A3 ▼ |
| P16 | COLOR ▼ | OFF ▼ | 600dpi ▼ | COATED PAPER ▼ | A3 ▼ |

[ OK ]　[ CANCEL ]

FIG.6

| ERROR |
|---|
| PLEASE RESET PAPER TYPE.<br>OK |

FIG.8

```
┌─ PRINT ─────────────────────────────────────────────┐
│  ┌─ PRINTER ────────────────────────────────────┐  │
│  │                               ┌PROPERTIES┐    │  │
│  │  STATUS: IDLE                 ☐ BLACK-AND WHITE│ │
│  │                                    PRINTING   │  │
│  │                               ☑ COLOR PRINTING│  │
│  └───────────────────────────────────────────────┘  │
│  ┌─ PRINTING RANGE ──────┐  ┌─ COPIES ──────────┐  │
│  │  ⦿ ALL                │  │ NUMBER OF  [ 5 ▲▼]│  │
│  │  ○ PAGES  [_____]  │  │ COPIES            │  │
│  └───────────────────────┘  │                   │  │
│  ┌─ PER-PAGE SETTING ────┐  │  ☑ COLLATE        │  │
│  │  ⦿ ON     ○ OFF       │  └───────────────────┘  │
│  │                       │  ┌─ PAGES-PER-SHEET ──┐ │
│  │   [PER-PAGE SETTING]  │  │ TWO-    [  ON   ]  │ │
│  │                       │  │ SIDED              │ │
│  └───────────────────────┘  │ PATTERN [A3 CENTER-│ │
│  ┌─ PAPER ───────────────┐  │         STITCHED 2UP]│
│  │     SIZE    [ A4   ▼] │  └────────────────────┘ │
│  │ PAPER TRAY  [AUTOMATIC▼]                        │
│  │ SELECTION                                       │
│  │ PAPER TYPE [STANDARD PAPER ▼]                   │
│  └───────────────────────┘                          │
│                              [  OK  ]  [ CANCEL ]   │
└─────────────────────────────────────────────────────┘
```

FIG.11

| PER-PAGE SETTING | | | COLOR/BLACK-AND-WHITE | | JAGGY PROCESSING | | RESOLUTION | | PAPER TYPE | | SIZE | |
|---|---|---|---|---|---|---|---|---|---|---|---|---|
| SHEET 1 | FRONT | P1,P16 | COLOR | ▶ | OFF | ▶ | 600dpi | ▶ | COATED PAPER | ▶ | A3 | ▶ |
| | BACK | P2,P15 | BLACK-AND-WHITE | ▶ | ON | ▶ | 400dpi | ▶ | COATED PAPER | ▶ | A3 | ▶ |
| SHEET 2 | FRONT | P3,P14 | BLACK-AND-WHITE | ▶ | ON | ▶ | 400dpi | ▶ | BOND PAPER | ▶ | A3 | ▶ |
| | BACK | P4,P13 | BLACK-AND-WHITE | ▶ | ON | ▶ | 400dpi | ▶ | BOND PAPER | ▶ | A3 | ▶ |
| SHEET 3 | FRONT | P5,P12 | BLACK-AND-WHITE | ▶ | ON | ▶ | 400dpi | ▶ | BOND PAPER | ▶ | A3 | ▶ |
| | BACK | P6,P11 | BLACK-AND-WHITE | ▶ | ON | ▶ | 400dpi | ▶ | COATED PAPER | ▶ | A3 | ▶ |
| SHEET 4 | FRONT | P7,P10 | BLACK-AND-WHITE | ▶ | ON | ▶ | 400dpi | ▶ | COATED PAPER | ▶ | A3 | ▶ |
| | BACK | P8,P9 | COLOR | ▶ | OFF | ▶ | 600dpi | ▶ | COATED PAPER | ▶ | A3 | ▶ |

OK          CANCEL

IMAGE RECORDING DEVICE, SYSTEM, AND METHOD

BACKGROUND OF THE INVENTION

1. Field of the Invention

The present invention relations to an image recording device that image-processes print data in accordance with an output instruction for the print data, generates an output image, and outputs the output image in accordance with output conditions of the output instruction.

2. Description of the Related Art

Color and black-and-white printers including a single cassette or multiple cassettes have been proposed as image recording devices that image-process print data in accordance with an output instruction for the print data, generate an output image, and output the output image in accordance with output conditions of the output instruction.

In these types of printers, when an electronic document is to be outputted as an image, it is possible to designate output conditions, such as the resolution, paper type, and number of output copies of the electronic document.

When the output conditions are determined by a user in correspondence to purpose and content of the electronic document, the output conditions are identified as a print job, printer settings are altered in accordance with the print job, and the printer image-processes and outputs the print data of the electronic document to match the output conditions.

It is also possible to set the output conditions by the print job, and one output condition can be set in one print job.

For example, in a case where pages containing only photographs and pages containing only text are both present in an electronic document to be outputted, and the pages containing only photographs are to be color printed on glossy paper and the pages containing only text are to be printed in black and white on high-quality standard paper, the pages containing only photographs are grouped together to create a print job, the pages containing only text are grouped together to create another print job, and the electronic document is divided into two print jobs and outputted.

When a single electronic document consisting of several pages is to be bound as a book, a cover is color printed using thick coated paper or the like, inner pages are printed in black and white using high-quality standard paper, and center-stitched portions of the photographs and the like are color printed using glossy paper, and when the pages are to be outputted under conditions that differ per page, pages that are to be outputted under the same conditions are grouped together into one print job and the electronic document is outputted as several print jobs.

However, when a single electronic document is divided into several print jobs and outputted, it has been necessary to instruct output several times. Further, when the output is to be bound as a book, it has been necessary to bind the book after reconstructing the single electronic document by sorting the outputted disorderly electronic document, and it has been necessary to divide the electronic document into many print jobs when the user does not wish to spend energy sorting the outputted electronic document.

Labor for instructing output several times and for reconstructing the electronic document costs energy and time, and is vexing and troublesome.

Further, there are frequently mistakes in reconstructing the electronic document.

Moreover, it has been necessary to create several print jobs again when there are output errors or when the electronic document is to be re-outputted, and management of the print jobs has been complicated.

SUMMARY OF THE INVENTION

In consideration of the above-described facts, it is an object of the invention to provide an image recording device that can easily and quickly output an electronic document containing pages whose output conditions differ.

A first aspect of a first invention is an image recording device that image-processes print data in accordance with an output instruction for the print data, generates an output image, and outputs the output image in accordance with output conditions of the output instruction, the image recording device comprising: an output instruction unit for instructing output including output conditions that differ by page; a storage unit for storing the output instruction including the output conditions that differ by page instructed by the output instruction unit; an image processing unit for image-processing print data by page in accordance with the output instruction stored in the storage unit to thereby generate image-processed print data; an image recording unit for recording an image on a recording medium on the basis of the image-processed print data generated in the image processing unit; and an output control unit for switching image recording conditions of the image recording unit in accordance with the output instruction.

According to the first aspect of the first invention, it is possible for the output instruction unit to input instructions including output conditions that differ by page, and it is possible to once instruct output including many output conditions.

Further, the output instruction, which is instructed by the output instruction unit and includes the output conditions that differ by page, is stored in the storage unit, and print data is image-processed by page by the image processing unit in accordance with the output instruction recorded in the storage unit, to thereby generate the output image. Thus, accommodation can be made even when output conditions that differ by page are instructed.

Moreover, the image recording unit records the image on the recording medium on the basis of the image-processed print data generated at the image processing unit, and the output control unit switches the output conditions of the image recording unit in accordance with the output instruction. Thus, it is possible for the output to match the output instruction even when output conditions that differ by page are instructed.

Accordingly, it is possible to easily and quickly output an electronic document containing pages whose output conditions differ.

A second aspect of the first invention is characterized in that, in the image recording device of the first aspect, the output conditions include at least one of color mode selection, the presence/absence of jaggy correction processing, resolution setting, and paper type selection.

According to the second aspect, in the image recording device of the first aspect, the image recording unit includes as an output condition at least one of color mode selection, the presence/absence of jaggy correction processing, resolution setting, and paper type selection, and it is possible to effect output, by color mode selection, of an electronic document including color images and black-and-white images with a single output instruction. By designating page the presence/absence of jaggy correction processing and resolution by page, output respectively suited thereto can be obtained with a single output instruction with respect to the output of an electronic document containing photographs and text. Further, because it is possible to select paper type, it is possible to change paper type depending on the page.

Accordingly, it is possible to easily output an electronic document containing pages whose output conditions differ.

Moreover, by making it possible to select the color mode and paper type from many types, the output of an electronic document containing photographs and text can be implemented with a single output instruction so that the photographs are outputted on glossy paper as color images and the text is outputted on high-quality standard paper as black-and-white images.

Resolution can be set in a case where the image recording unit supports many resolutions. In this case, resolutions that differ according to the type of image, such as photograph or text, can be set.

A third aspect of the first invention is characterized in that, in the image recording device of the first aspect, the output instruction unit determines whether or not there are contradictions in the output instruction for the print data, and prompts resetting with respect to contradictions.

According to the third aspect, in the image recording device of the first aspect, the output instruction unit determines whether or not there are contradictions in the output instruction for the print data, and prompts resetting with respect to contradictions. Because output can be more reliably instructed than methods that invalidate contradicting output instructions without notifying the user or that give preference to one of the contradicting instructions, labor becomes easy and quick.

A fourth aspect of the first invention is characterized in that, in the image recording device of the first aspect, a display for displaying an appearance when image recording is actually effected in accordance with instruction content of the output instruction unit is included.

According to the fourth aspect, because it is possible to display on the display an appearance when image recording is actually effected in accordance with instruction content of the output instruction unit, it is possible to detect problems in the instruction content without actually outputting those problems, and it is possible to quickly move labor forward without waste.

It should be noted that any kind of display, such as a liquid-crystal display or an organic EL display, can be used as the display.

A second invention is an image recording device comprising: an image processing unit for image-processing print data by page in accordance with an output instruction including output conditions that differ by page, to thereby generate image-processed print data; and an image recording unit for recording an image on a recording medium in accordance with the output conditions on the basis of the image-processed print data generated in the image processing unit.

A third invention is an image recording method comprising the steps of: image-processing print data by page in accordance with an output instruction including output conditions that differ by page, to thereby generate image-processed print data; and recording an image on a recording medium in accordance with the output instruction on the basis of the image-processed print data generated in the image processing step.

BRIEF DESCRIPTION OF THE DRAWINGS

FIG. 3 is a view showing a print screen displayed on a monitor of an outside output conditions instruction unit pertaining to the embodiment;

FIG. 4 is a view showing a per-page setting screen displayed on the monitor of the outside output conditions instruction unit pertaining to the embodiment;

FIG. 6 is a view showing an example of an error message displayed on the monitor of the outside output instruction unit pertaining to the embodiment;

FIG. 8 is an output conditions creation screen displayed on the monitor of the color printer pertaining to the embodiment;

FIG. 11 is a view showing another per-page setting screen resulting from an instruction setting method of the output conditions instruction unit.

DESCRIPTION OF THE PREFERRED EMBODIMENT

Figure 1:
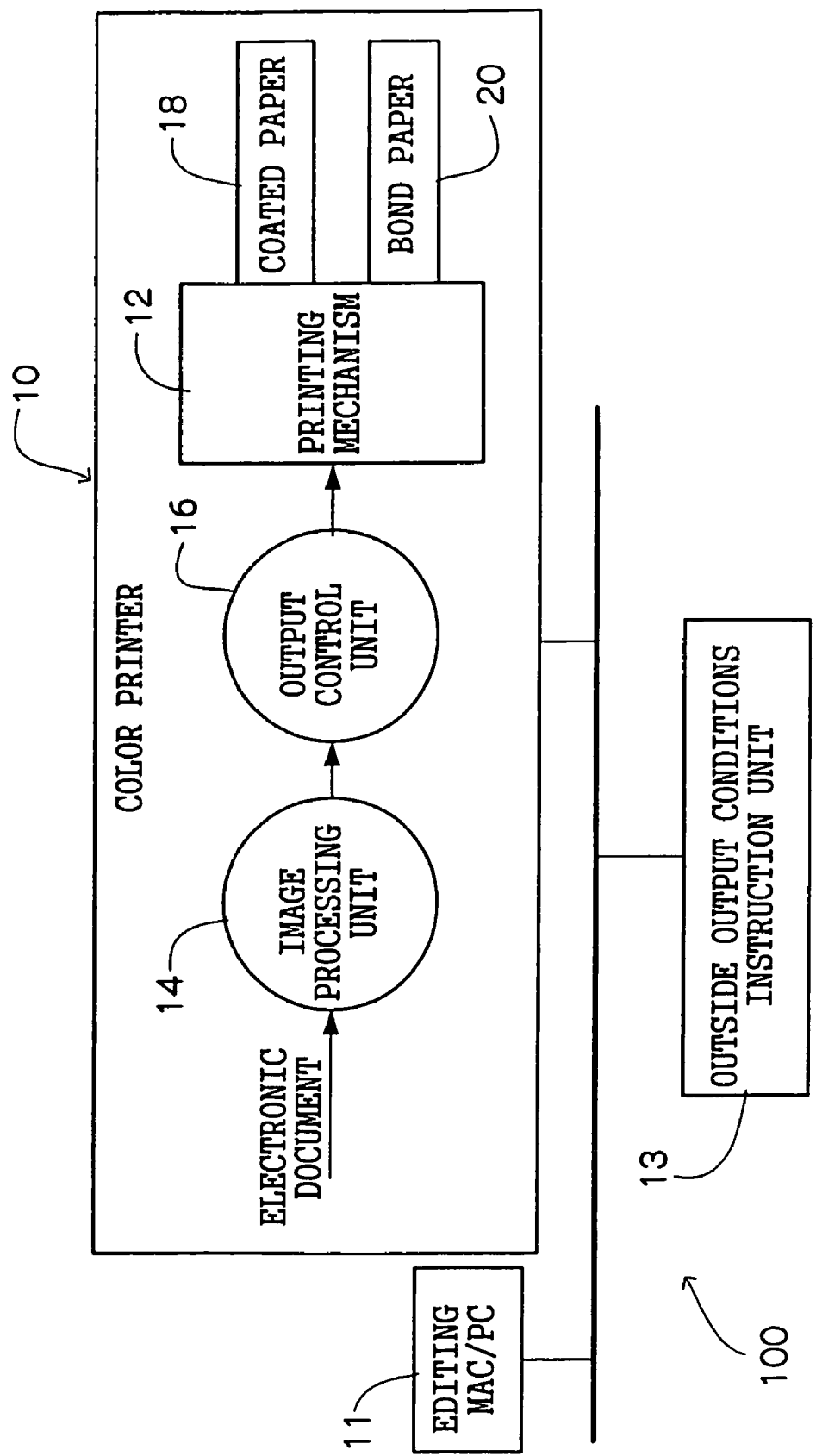
FIG. 1 is a schematic view showing an image recording system pertaining to an embodiment of the invention.

In FIG. 1, an image recording system pertaining to an embodiment of the invention is illustrated.

The image recording system includes a computer 100, which serves as a terminal, and a color printer 10, which serves as an image recording device. The computer 100 includes an editing PC/MAC 11, for editing electronic documents, and an outside output conditions instruction unit 13.

In the present embodiment, the color printer 10 is connected to the editing PC/MAC 11 and to the outside output conditions instruction unit 13.

The color printer 10 includes: an image processing unit 14 that image-processes an electronic document to be outputted, to thereby generate an output image; a printing mechanism 12 for outputting the output image; and an output control unit 16 for controlling the printing mechanism 12 in accordance with a print job. A paper tray 18 for coated paper and a paper tray 20 for bond paper are disposed at the printing mechanism 12 as trays for accommodating paper.

Figure 2:
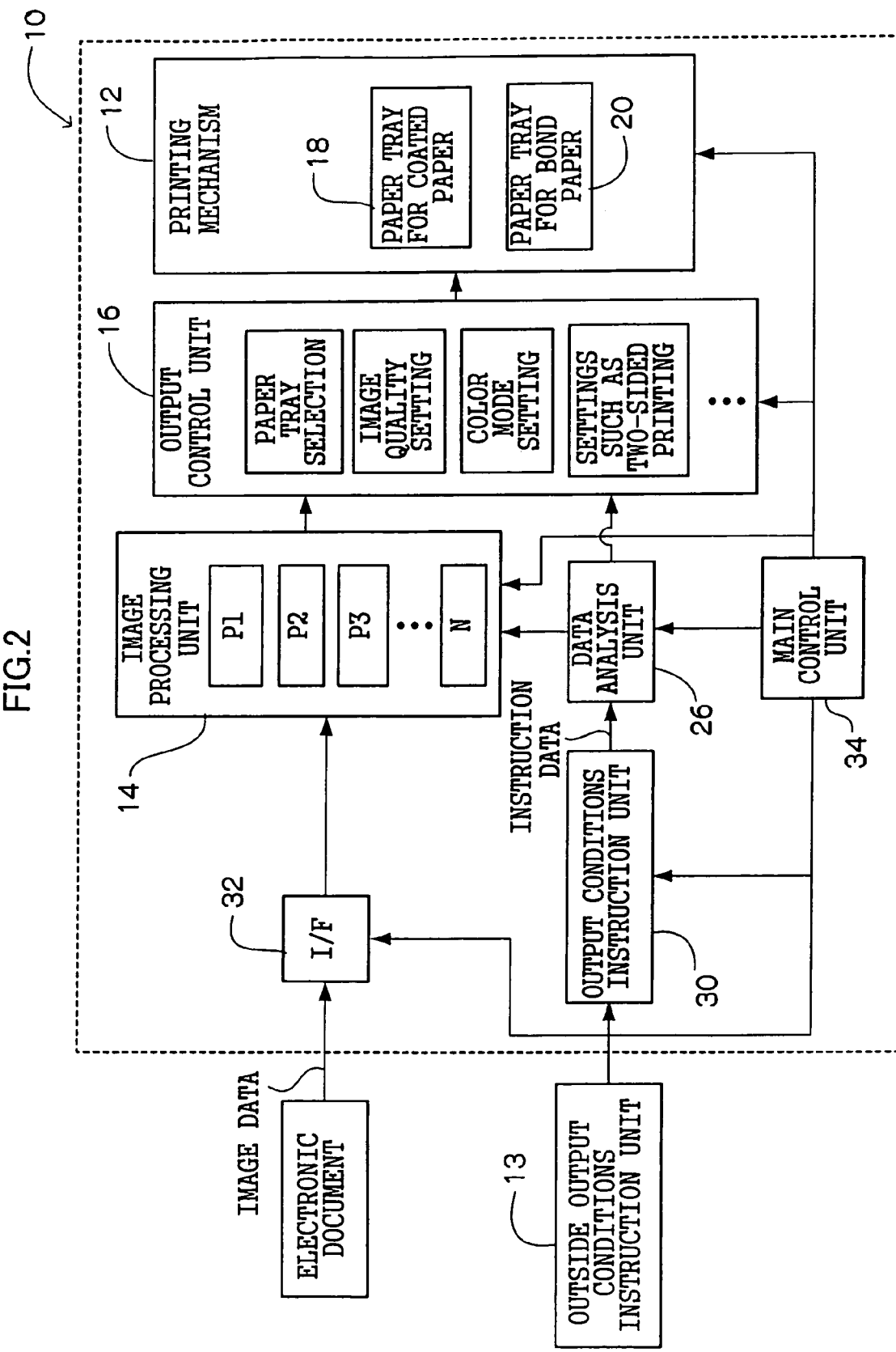
FIG. 2 is a block diagram of functions of a printer pertaining to the embodiment.

In FIG. 2, a block diagram of functions of the color printer 10 is illustrated.

The color printer 10 includes: an interface 32 (referred to below as "the I/F 32") that serves as an input unit for importing print data of an electronic document and output instruction data created at the terminal; an output conditions instruction unit 30 that serves as a setting unit for setting output conditions of the electronic document and creating a print job; the outside output conditions instruction unit 13 that includes a display of the terminal and is capable of creating a print job for the electronic document from the outside; a data analysis unit 26 for analyzing and storing instruction data of the print job; the image processing unit 14 for image-processing each page of the print data in accordance with the instruction data, to thereby create the output image; the printing mechanism 12 for recording the output image on paper; and the output control unit 16 for controlling the printing mechanism 12 in accordance with the instruction data.

The paper tray 18 for accommodating coated paper and the paper tray 20 for accommodating bond paper are disposed at the printing mechanism 12, and are selectively used in accordance with the instruction data.

Moreover, the operation of each unit is controlled by a main control unit 34 that controls the entire color printer 10.

The main control unit 34 controls: the I/F 32 to import print data of the electronic document; the output conditions instruction unit 30 to create a print job for the electronic document; and the analysis unit 26 to analyze the instruction data and temporarily store the instruction data. The main control unit 34 also controls the image processing unit 14 to image-process each page in accordance with the instruction data, to thereby generate the output image, the output control unit 16 to control the printing mechanism 12 in accordance with the instruction data relating to the output image, and the printing mechanism 12 to record an image.

The outside output conditions instruction unit 13 utilizes Graphical User Interface (GUI) functions that create output conditions on the basis of an output conditions creation screen displayed on a monitor (not illustrated). An example of the output conditions creation screen (referred to below as the "print screen") is illustrated in FIG. 3.

Boxes for designating settings relating to the output such as the printer, printing range, number of copies, and paper, and a box for selecting whether or not to validate settings for output conditions per page, are displayed in the print screen.

When an "All" heading is selected (when a black circle is displayed within a white circle preceding the heading) in the print range box, the entire electronic document is outputted. When only some of the electronic document is to be outputted, the "Pages:" heading is selected and the numbers of the pages to be outputted are inputted in the box following the heading.

In the number of copies box, it is possible to designate the number of copies to be outputted by inputting a number. When outputting several copies of several pages, it is possible to designate output order so that printing is carried out by collating the copies, without having to later sort out the order.

In the printer box, the name of the current color printer 10, a "Properties" button, and a check box for selecting a color printing mode are displayed.

When the "Properties" button is selected, a printer properties screen (not illustrated) is displayed, and detailed output conditions for resolution and each processing can be set.

In the paper box, paper size, type of paper tray, and type of paper can be selected. When paper size and type of paper are selected, the corresponding paper tray 18 or 20 is automatically selected.

Also, the type of paper tray is selectable from automatic and from the paper trays 18 and 20. When the type of tray 18 or 20 is selected, paper is supplied from the designated tray, and when automatic is selected, the paper tray for the paper selected in the paper size and type of paper boxes is automatically selected.

In a state in which an "ON" heading in a per-page setting box is selected (when a black circle is displayed within a white circle preceding the heading), a "Per-Page Setting" button becomes selectable, and when the "Per-Page Setting" button is selected, a per-page setting screen such as the one illustrated in FIG. 4 is displayed.

Setting regions for setting image processing conditions, image recording conditions, and common conditions by page are included in the per-page setting screen. Specifically, settings can be effected for each page with respect to headings for color mode, image processing, resolution, paper type, and paper size, a combo box displayed at the right end of each heading is selected, and conditions are selected from a displayed pull-down menu. That is, color mode and jaggy processing are included in the image processing conditions, paper type is included in the image recording conditions, and resolution is included in the common conditions.

When the "Per-Page Setting" is turned "ON", in a case where content selected in the "Printer" box differs from content that has been selected in the "Per-Page Setting" box with regard to a heading that is the same in the "Printer" box, the setting selected in the "Per-Page Setting" is preferentially adopted. For example, even if the color mode has been set to black-and-white in the "Printer" box, output is effected in color when the color setting has been selected in the "Per-Page Setting".

Also, because several pages of the electronic document are printed on one sheet of paper when "Pages Per Sheet" or "Two-Sided Printing" is selected in the printer properties, it is necessary to use the same settings for pages to be printed on the same sheet of paper.

Figure 5A:
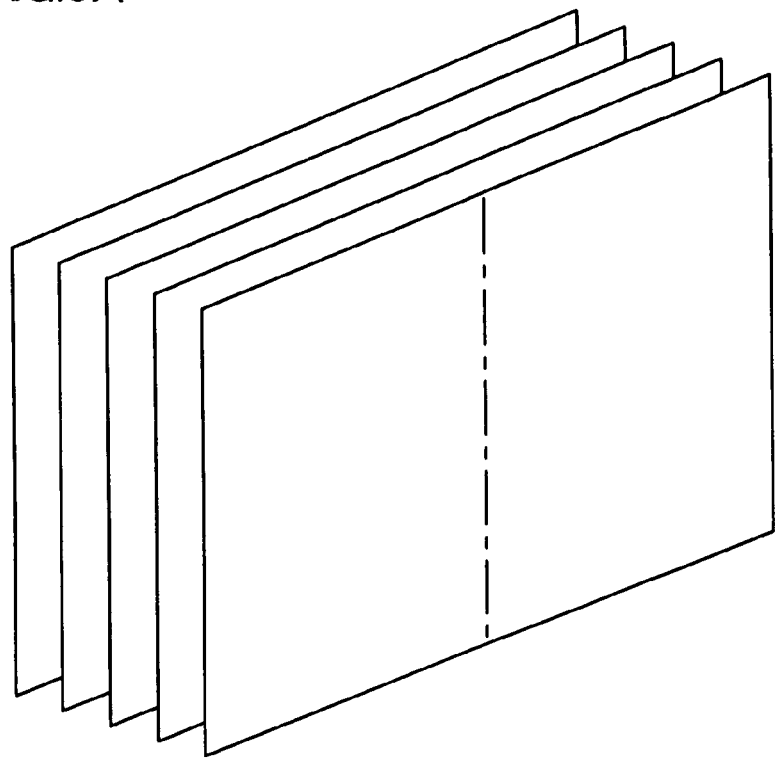
FIGS. 5A and 5B are views when a booklet is created by outputting an electronic document in the embodiment, with FIG. 5A being an oblique perspective view in which pages of the outputted electronic document are superimposed, and FIG. 5B being an oblique perspective view in which the booklet is created by center-stitching the superimposed output.
Figure 5B:
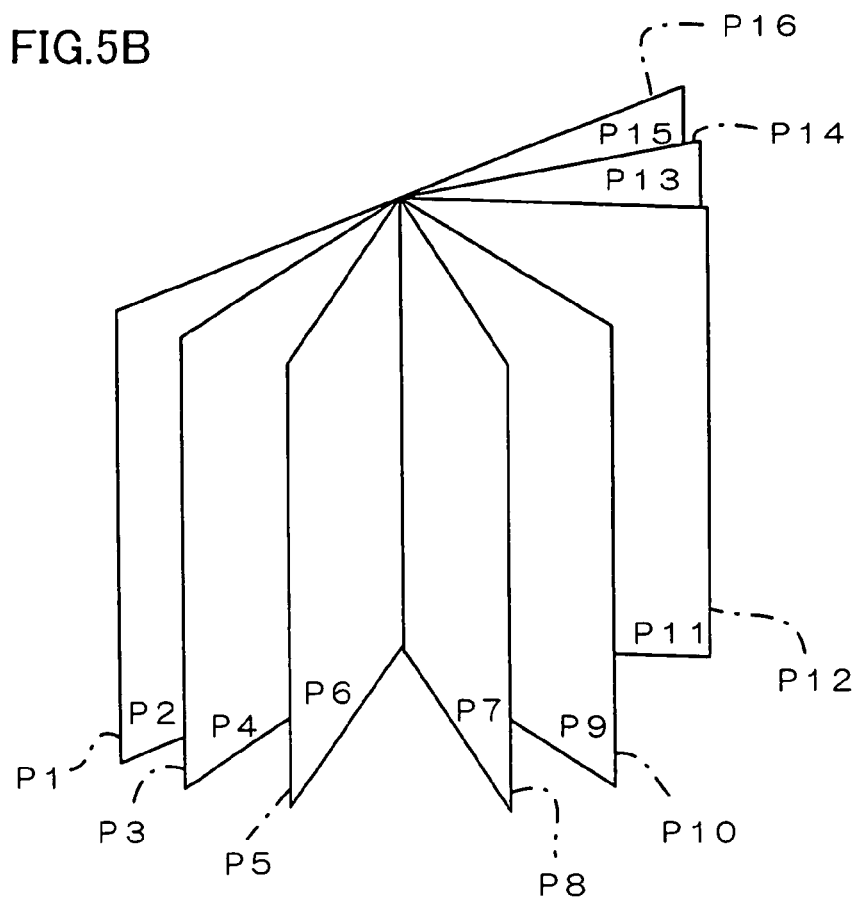

For example, as shown in FIG. 5A, when the electronic document is outputted by two-sided printing and the printed sheets of paper are superimposed and stitched in the middle to create a booklet, such as the one shown in FIG. 5B, it is necessary to set the same paper type and paper size for the pages (P1, P2, P15, and P16 in FIG. 5B) to be printed on one sheet of paper, and it is necessary for the output conditions to be the same for pages (P1 and P16 in FIG. 5B) to be printed on the same side.

Figure 6:
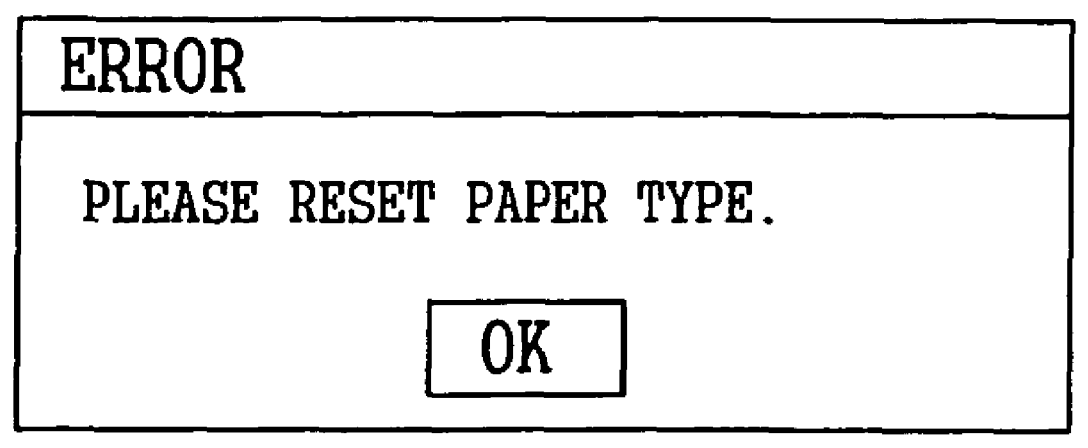

When the settings for the output conditions of related pages are not consistent at the time setting of the headings in the "Per-Page Setting" screen has been concluded, an error message is displayed. For example, when the setting for paper type is not the same for pages to be printed on one sheet of paper, an error message prompting the user to reset paper type is displayed, as shown in FIG. 6.

The print job created at the outside output conditions instruction unit 13 in this manner can be altered by the output conditions instruction unit 30 disposed at the color printer 10.

Figure 7:
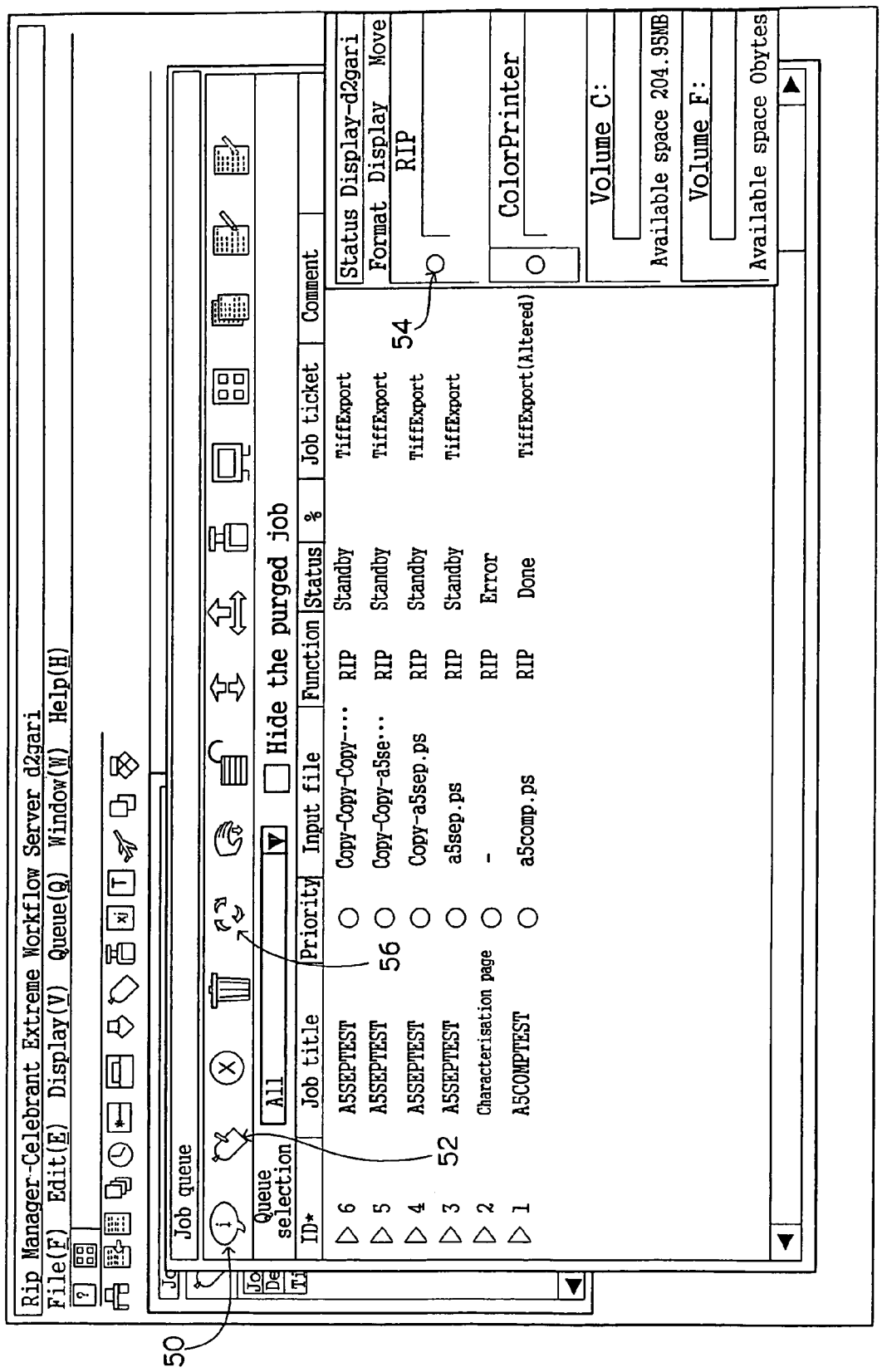
FIG. 7 is a view showing a job queue displayed on a monitor of a color printer pertaining to the embodiment.

When the print job is altered by the output conditions instruction unit 30, the print job whose job content is to be altered is selected from a job queue (see FIG. 7) displayed on the monitor (not illustrated) disposed on the color printer 10, and an edit icon 52 is selected from the icons displayed in a tool bar 50.

In this instance, it is necessary to stop the job inputted to the color printer from being printed by pressing down a Raster Image processing unit (RIP) processing stop button 54.

When the edit icon 52 is selected, an output condition creation screen such as the one shown in FIG. 8 is displayed on the monitor, and the content of the print job is altered by the GUI functions.

It is possible to instruct pages-per-sheet in the output condition creation screen, just as it is in the print screen of the outside output conditions instruction unit 13. It is also possible to decide whether or not to use the two-sided printing function and to instruct pages-per-sheet patterns (page imposition patterns).

Alteration of the content of the print job can also be effected with respect to jobs for which printing has been temporarily completed. In this case, the print job is selected from the job queue, and after the content has been altered, a re-output icon 56 is selected from among icons displayed in the tool bar 50 of the job queue, whereby the electronic document is outputted on the basis of the altered print job.

The action of the present embodiment will be described below.

When a sixteen-page electronic document is to be outputted by two-sided printing using the color printer 10 and five booklets are to be created, first, the output conditions are set in accordance with the print screen displayed on the monitor of the outside output conditions instruction unit 13, to thereby create the print job.

A user confirms that the color printer 10 is in a printable status by looking at "Status" in the "Printer" box. "Properties" is selected and setting is conducted so that P1 and P16, P2 and P15, P8 and P9, and so on, are respectively fitted onto single sheets, and two-sided printing is set.

Next, "All" is selected in the printing range, and the number of copies is set to "5".

When the "Per-Page Setting" is turned "ON" and "Per-Page Setting" is selected, per-page setting processing is implemented.

Figure 9A:
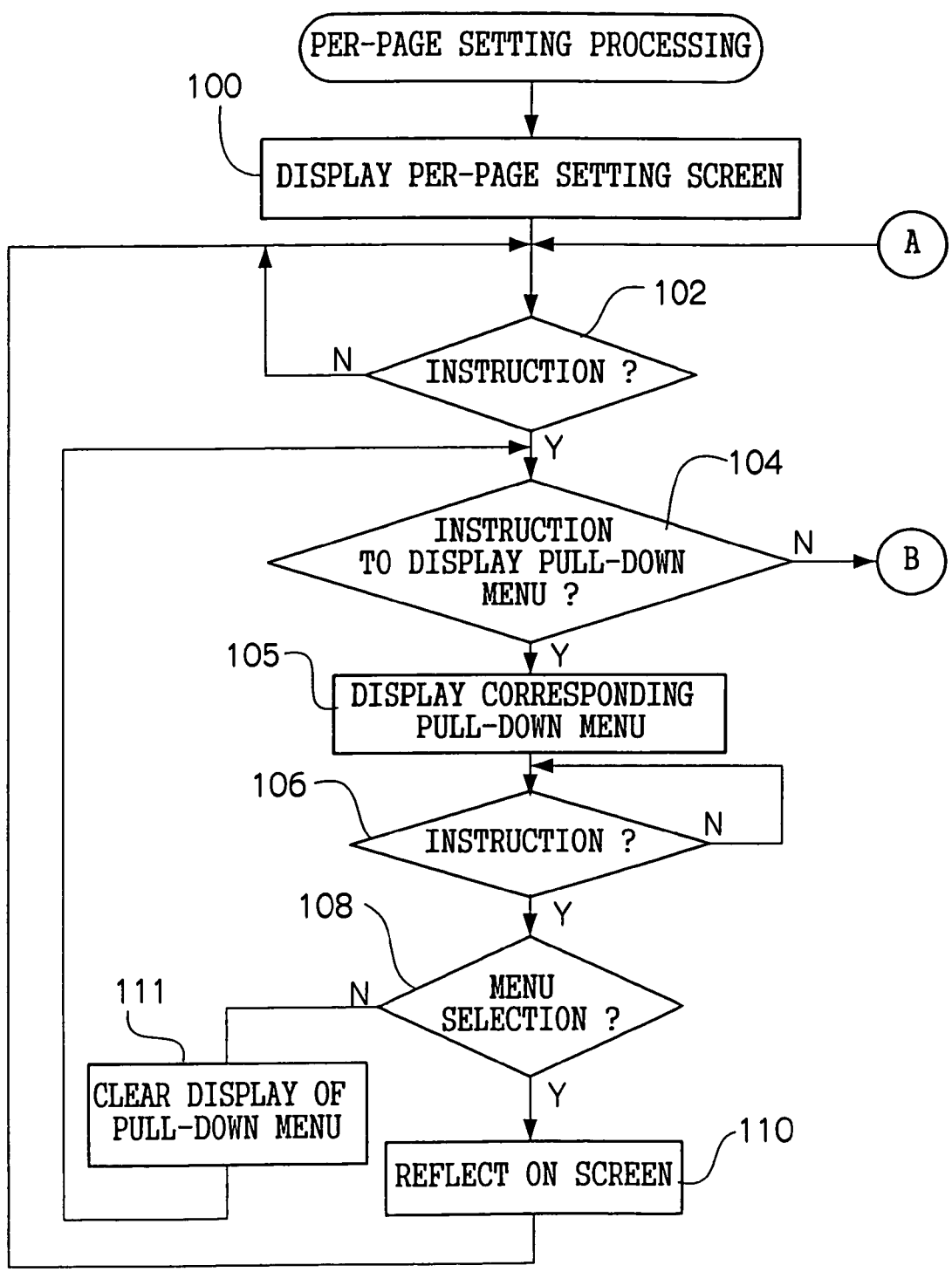
FIGS. 9A and 9B are flow charts showing the flow of a per-page setting processing program pertaining to the embodiment.
Figure 9B:
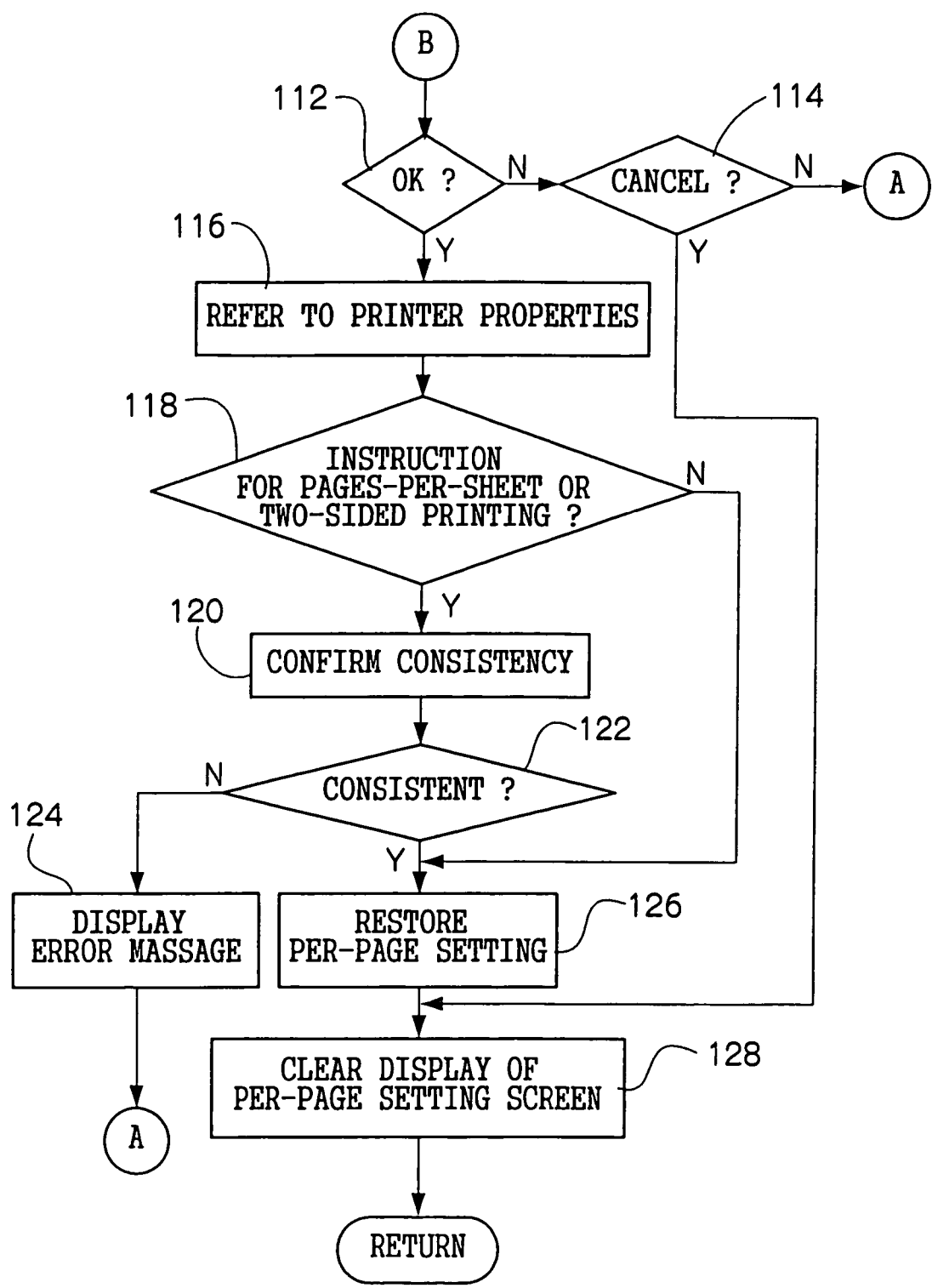

Per-page setting processing will be described below with reference to FIGS. 9A and 9B. FIGS. 9A and 9B are flow charts showing the flow of a per-page setting processing program implemented by the main control unit 34 of the present embodiment.

First, the per-page setting screen is displayed in step 100, and the program proceeds to step 102 to wait for the next instruction from the user.

In step 104, it is determined whether the instruction from the user is for instructing display of the pull-down menu for each page disposed in the setting screen. When the determination is affirmative, the program proceeds to step 105, where the corresponding pull-down menu is displayed. Thereafter, the next instruction is waited upon in step 106.

In step 108, it is determined whether or not the instruction in step 106 is a menu selection instruction. When the determination is affirmative, the program proceeds to step 110, selection content is reflected in the per-page setting screen, and then the program returns to step 102 to wait for an instruction. When the determination in step 108 is negative, selection from the pull-down menu is regarded as having been terminated, the program proceeds to step 111, display of the pull-down menu is cleared, and then the program returns to step 104, where it is determined whether the instruction from the user is for instructing display of the pull-down menu.

When the determination in step 104 is negative, the program proceeds to step 112 (FIG. 9B), where it is determined whether or not the instruction is an instruction for selecting an "OK" button. When the determination is negative, the program proceeds to step 114, where it is determined whether or not the instruction is an instruction for selecting a "Cancel" button. When the determination in step 114 is negative, the instruction is regarded as being invalid and the program returns to step 102, where the next instruction is once again waited upon. When the determination in step 114 is affirmative, the instruction is regarded as being one for terminating the per-page setting, and the per-page setting processing is concluded.

When the determination in step 112 is affirmative, the program proceeds to step 116, where the setting of "Printer Properties" is referenced. In step 118, it is determined whether or not an instruction for pages-per-sheet or two-sided printing has been given. When the determination is affirmative, the program proceeds to step 120, where consistency is confirmed.

That is, it is determined whether or not contradictory settings have been made between the pages to be printed on the same side of a sheet of paper by pages-per-sheet or between pages to be printed on the same sheet of paper by two-sided printing.

In the present embodiment, P1 and P16, which become the cover, are color printed using the thick coated paper, and P8 and P9 are color printed using the coated paper because they are photographs. Other pages are printed in black-and-white using high-quality standard paper.

In this case, because P2, P15, P7, and P10 are printed on reverse surfaces of the paper to be printed using the coated paper, the pages are printed in black-and-white using the coated paper, and the actual setting is as appears in FIG. 4.

In step 122, it is determined whether or not the settings are consistent as a result of confirming consistency. When the determination is negative, the program proceeds to step 124, where an error message is displayed (see FIG. 6), and then the program returns to step 102 (FIG. 9A), where an instruction is once again waited upon.

When the determination in step 122 is affirmative, the program proceeds to step 126, where per-page setting is restored, and then the program proceeds to step 128, the corresponding screen display is cleared, the per-page setting processing is concluded, and the print screen returns.

When "OK" is selected in the print screen, the print job is completed and the output instruction data is outputted to the printer system 10.

When the color printer 10 confirms the output instruction data, the color printer 10 adds the print job to the job queue and implements output processing.

The output processing is terminated when the RIP processing stop button 54 is pressed down. When the content of the print job is to be altered by the output conditions instruction unit 30, the RIP processing stop button 54 is pressed down, the print job whose job content is to be altered in the job queue (see FIG. 7) displayed on the monitor disposed at the color printer 10 is selected, and the edit icon 52 is selected from the icons displayed in the tool bar 50.

After the job content has been altered on the basis of the output instruction creation screen displayed on the monitor, the re-output icon 56 is selected from the icons displayed in the tool bar 50 of the job queue, and the color printer 10 newly implements output processing.

Figure 10:
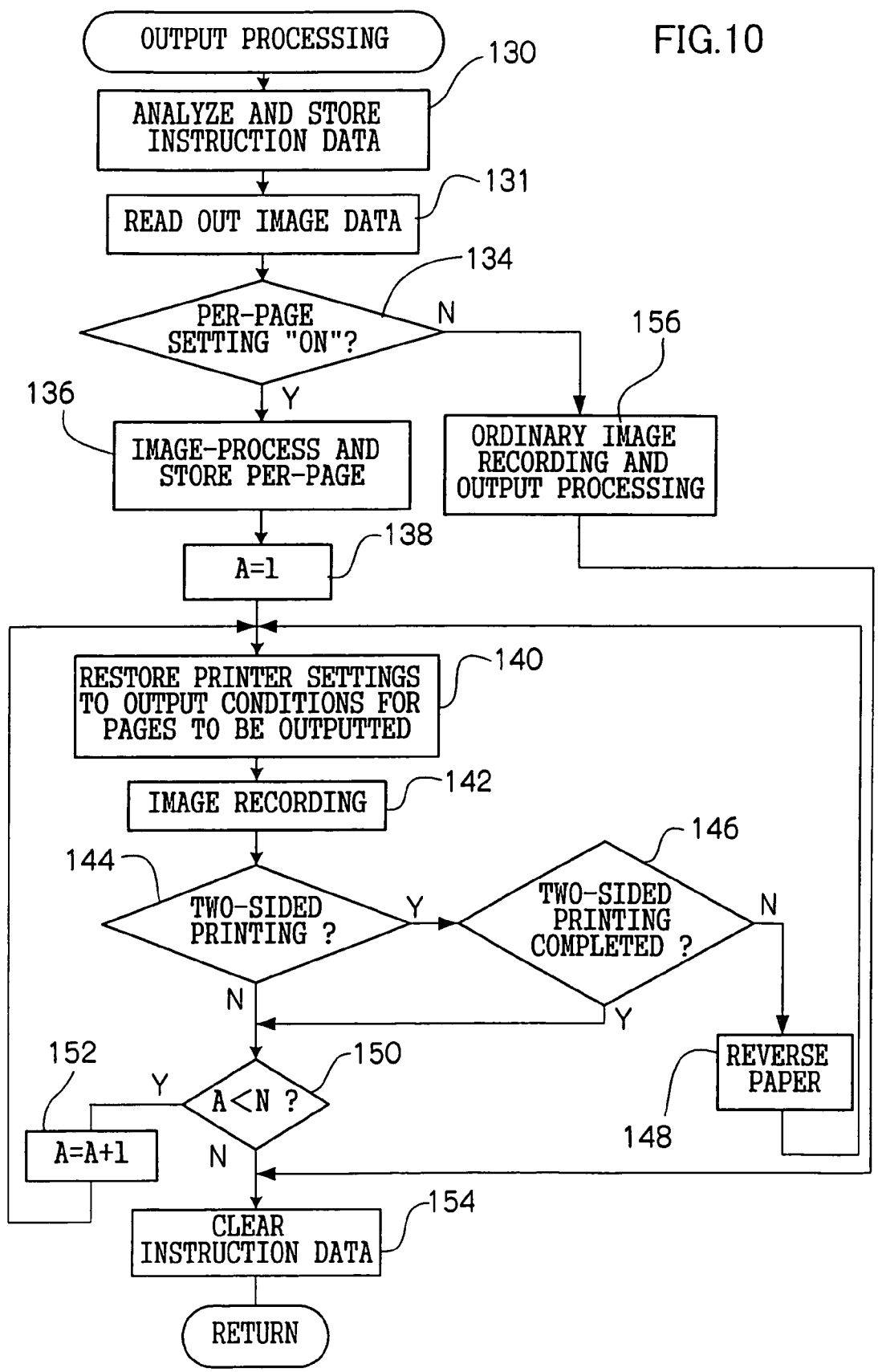
FIG. 10 is a flow chart showing the flow of an output processing program pertaining to the embodiment.

The output processing will be described below with reference to FIG. 10. FIG. 10 is a flow chart showing the flow of an output processing program implemented by the main control unit 34 of the present embodiment.

First, in step 130, instruction data is analyzed by the data analysis unit 26 and temporarily stored, and then the program proceeds to step 131, where image data of the electronic document to be outputted is read out via the I/F 32.

In step 134, it is determined whether or not the per-page setting is "ON". When the determination is affirmative, the program proceeds to step 136. In step 136, print data of each page is image-processed by the image processing unit 14 in accordance with the instruction data, to thereby create an output image, and the output image is temporarily stored. For example, when P1 of the present embodiment is image-processed in accordance with the instruction data, the image becomes an A3-size color image with a resolution of 600 dpi.

Next, in step 138, 1 is inputted for the value of a counter A that counts the number of copies (A=1), the program proceeds to step 140, the setting of the printing mechanism 12 is matched to the output conditions of the pages to be outputted in accordance with the instruction data, the program proceeds to step 142, and image recording is initiated.

With regard to the setting of the output conditions of the printing mechanism 12, in processing the P1 and P16 side of the first sheet, two-sided printing and pages-per-sheet, which are common settings, are set as the print job of the electronic document, the color mode is set to color, the resolution is set to 600 dpi, and the paper tray is set to the paper tray 18 in which A3-size coated paper is accommodated.

When an image is recorded in step 142, the program moves to step 144, where it is determined whether or not an instruction for two-sided printing has been given. When the determination in step 144 is affirmative, the program proceeds to step 146, where it is determined whether or not the two-sided printing has been completed. When the determination in step 146 is negative, the program proceeds to step 148, where the paper is reversed, and the program returns to step 140, where an image is formed on the reverse surface.

When printing of P1 and P16 of the first sheet is concluded, the paper is reversed, the settings of the output conditions of the printing mechanism 12 are changed to match the output conditions of P2 and P15, so that the color mode is set to black and white and the resolution is set to 400 dpi, and an image is recorded on the reverse surface of the printed side of P1 and P16.

When the determination in step 144 is negative (when there is no instruction for two-sided printing) or when the determination in step 146 is affirmative (when two-sided printing is concluded), the program proceeds to step 150, where it is determined whether or not the relation between the counter A value and the number of copies N (in FIG. 5, N=4) is A<N. When the determination is affirmative, 1 is added to the counter value A at step 152 and the program returns to step 140, where the next output is effected. When the determination in step 150 is negative, the program proceeds to step 154, where the print job is regarded as being finished, the instruction data stored in the data analysis unit 26 and the output image stored in the image processing unit 14 are cleared, and the output processing is concluded.

When the determination in step 134 is negative, the program proceeds to step 156, where ordinary image recording and output processing are conducted, and then the program proceeds to step 154, where the instruction data and the output image are cleared and output processing is concluded.

The pages of the electronic document outputted by the color printer 10 can be superimposed and center-stitched to create a booklet without being sorted by human hands.

As described above, according to the color printer 10 of the present embodiment, it is possible to create a print job that includes output conditions that differ by page, instruction data is analyzed at the data analysis unit and instructed instruction data including output conditions that differ by page is stored, image processing is effected by page by the image processing unit 14 in accordance with the instruction data stored in the data analysis unit 26, an output image is generated, the output conditions of the printing mechanism 12 are switched by the output control unit 16 in accordance with the output instruction data, and the output image generated at the image processing unit 14 is printed by the printing mechanism 12.

Accordingly, it is possible to easily and quickly output an electronic document containing pages whose output conditions differ.

It is also determined whether or not there are contradictions in the instruction data of the print data, and resetting is prompted with respect to contradictions, whereby wasted output resulting from setting mistakes of the user can be prevented.

Moreover, it is possible to display on the display an appearance when image recording is actually effected in accordance with the instruction data, it is possible to detect problems in the instruction content without actually outputting those problems, and it is possible to quickly move labor forward without waste.

It should be noted that, in the present embodiment, an error message is displayed with respect to inconsistent settings in the per-page setting at the output conditions instruction unit 30 when there has been a pages-per-sheet instruction or a two-sided printing instruction. However, as shown in FIG. 11, the invention can be configured so that conditions that should have the same setting are grouped together and so that it is not possible to set differing output conditions for those conditions.

In the present embodiment, as example has been given of a case where the output conditions are set per single page. However, the invention is not limited to the same. It is also possible to configure the invention so that a desired page or pages is/are selected, output conditions are set, and predetermined settings are made for the rest.

Also, color mode selection, the presence/absence of jaggy correction processing, resolution setting, and paper type selection are given as examples of settable output conditions. However, the present invention is not limited to the same. Zoom, page orientation (vertical or horizontal), number of copies, paper supply method, and other settings are also possible.

As described above, according to the invention, in an image recording device that image-processes print data in accordance with an output instruction for the print data, generates an output image, and outputs the output image in accordance with output conditions of the output instruction, it is possible to easily and quickly output an electronic document containing pages whose output conditions differ.

What is claimed is:

1. An image recording device that image-processes print and photographic data in accordance with an output instruction for the print and photographic data, generates an output image, and outputs the output image in accordance with output conditions of the output instruction, the image recording device comprising:

an output instruction unit for instructing output including output conditions that differ by page;

a storage unit for storing the output instruction including the output conditions that differ by page instructed by the output instruction unit;

an image processing unit for image-processing print and photographic data by page in accordance with the output instruction stored in the storage unit to thereby generate image-processed print and photographic data;

an image recording unit for recording an image on a recording medium selected from standard paper and coated photographic paper on the basis of the image-processed print data generated in the image processing unit; and an output control unit for switching image recording conditions of the image recording unit in accordance with the output instruction;

wherein the output instruction unit determines whether or not there are contradictions in the output instruction for the print and photographic data, and prompts resetting with respect to contradictions and wherein the contradictions relate to the selection of standard paper or coated photographic in accordance with the print and photographic data.

2. The image recording device of claim 1, wherein the output conditions include at least one of color mode selection, the presence/absence of jaggy correction processing, resolution setting, and paper type selection.

3. The image recording device of claim 1, further including a display for displaying an appearance when image recording is actually effected in accordance with the output instruction by the output instruction unit.

4. The image recording device of claim 1 wherein the contradictions are contradictory settings made between pages to be printed on the same side of a sheet of paper by a pages-per-sheet setting.

5. The image recording device of claim 1 wherein the contradictions are contradictory settings made between pages to be printed on the same sheet of paper by two-sided printing.

6. An image recording device comprising:
   an image processing unit for image-processing print and photographic data by page in accordance with an output instruction sent from an output instruction unit including output conditions that differ by page, to thereby generate image-processed print and photographic data; and
   an image recording unit for recording an image on a recording medium including standard paper and coated photographic paper in accordance with the output conditions on the basis of the image-processed print and photographic data generated in the image processing unit. wherein the output instruction unit determines whether or not there are contradictions in the output instruction for the print and photographic data, and prompts resetting with respect to contradictions and wherein the contradictions relate to the selection of standard paper or coated photographic in accordance with the print and photographic data.

7. The image recording device of claim 6, further including an input unit for inputting the print and photographic data and data of the output instruction, wherein the image processing unit image-processes the print and photographic data in accordance with the data of the output instruction inputted by the input unit.

8. The image recording device of claim 6, further including a setting unit for setting the output instruction, wherein the image processing unit effects image processing in accordance with the output instruction set by the setting unit.

9. The image recording device of claim 6, wherein at least image processing conditions and image recording conditions are included in the output conditions.

10. The image recording device of claim 9, wherein common conditions common to the image processing conditions and to the image recording conditions are further included in the output conditions.

11. The image recording device of claim 8, wherein the setting unit includes a display for setting the output instruction.

12. The image recording device of claim 11, wherein at least image processing conditions and image recording conditions are included in the output conditions, and setting regions for setting the image processing conditions and the image recording conditions by page are included on a display screen of the display.

13. The image recording device of claim 12, wherein common conditions common to the image processing conditions and to the image recording conditions are further included in the output conditions, and setting regions for setting the common conditions by page are included on the display screen of the display.

14. The image recording device of claim 6, wherein the output conditions include at least one of color mode selection, the presence/absence of jaggy correction processing, resolution setting, and paper type selection.

15. An image recording system comprising:
   a terminal for creating output instruction data including output conditions that differ by page; and
   the image recording device of claim 7,
   wherein the input unit inputs the output instruction data created by the terminal.

16. The image recording system of claim 15, wherein the terminal includes a display for setting and displaying the output instruction.

17. The image recording system of claim 15, wherein the terminal determines whether or not there are contradictions between the by-page output conditions of the output instruction, and prompts resetting when there are contradictions.

18. The image recording system of claim 16, wherein the display displays an appearance of an image to be recorded on the recording medium in accordance with the output instruction.

19. An image recording method comprising
   image-processing print and photographic data by page in accordance with an output instruction sent from an output instruction unit including output conditions that differ by page, to thereby generate image-processed print and photographic data; and
   recording an image on a recording medium including standard paper and coated photographic paper in accordance with the output instruction on the basis of the image-processed print and photographic data generated in the image processing step:
   wherein the output instruction unit determines whether or not there are contradictions in the output instruction for the print and photographic data, and prompts resetting with respect to contradictions and wherein the contradictions relate to the selection of standard paper or coated photographic in accordance with the print and photographic data.

20. The image recording method of claim 19, further comprising displaying an appearance of an image to be recorded on the recording medium in accordance with the output instruction.

* * * * *